E. D. WOODS.
VEHICLE WHEEL.
APPLICATION FILED AUG. 14, 1916.
1,295,664.
Patented Feb. 25, 1919.
3 SHEETS—SHEET 1.
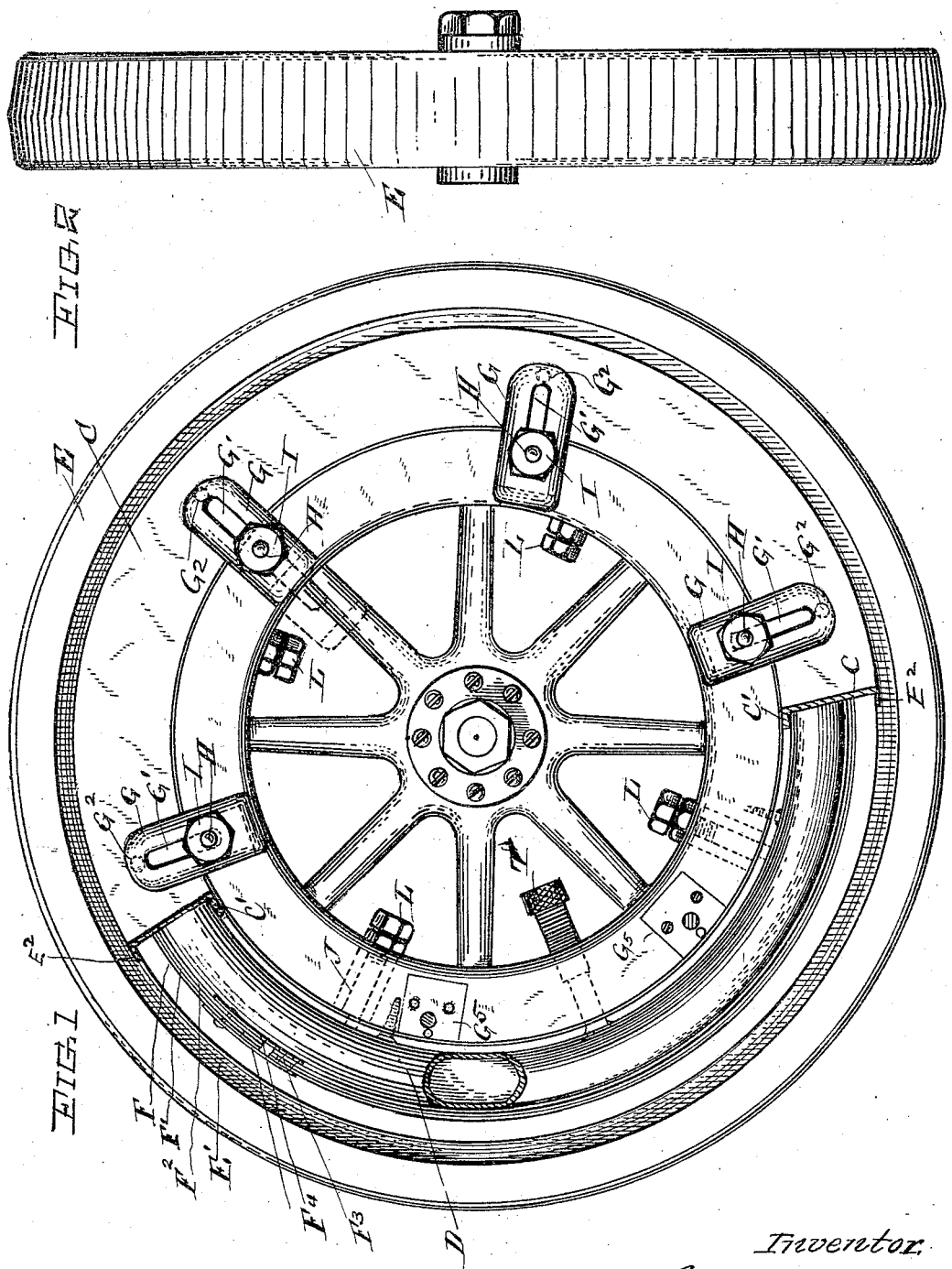
Inventor.
Edward D. Woods
By ...
Attorney.

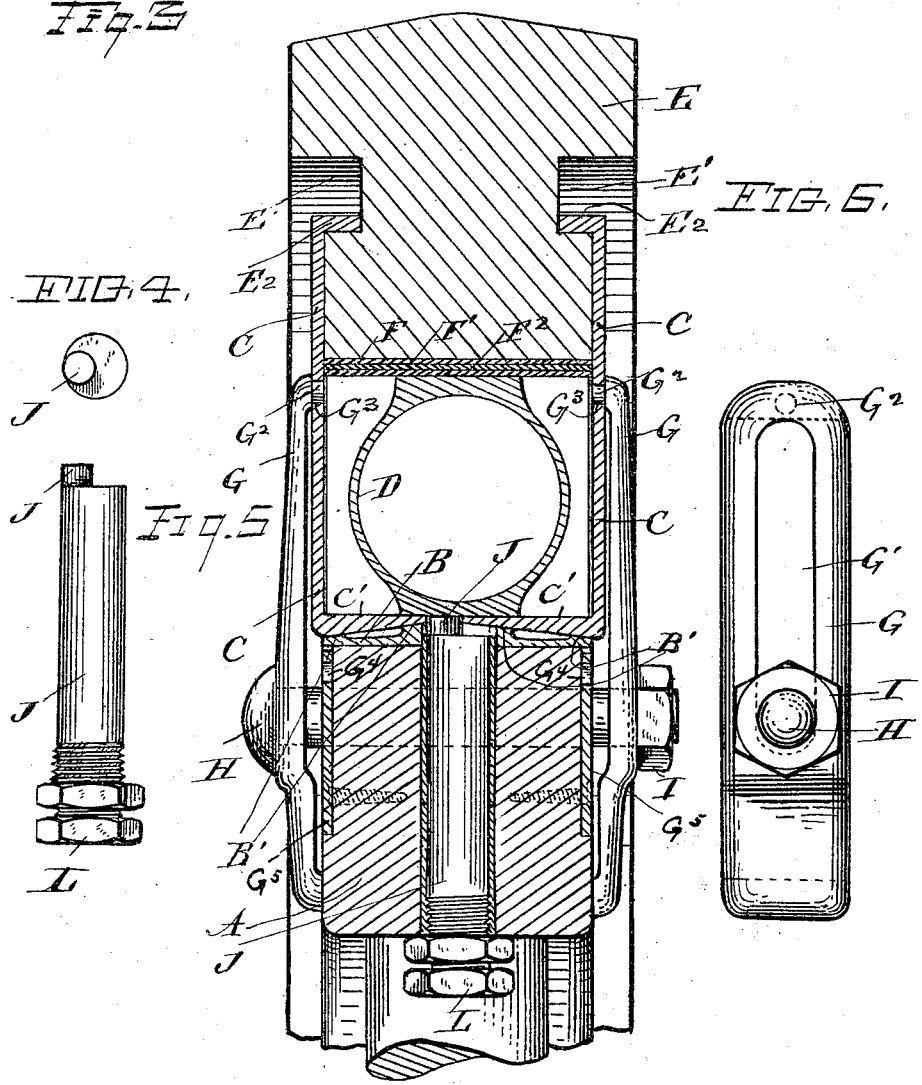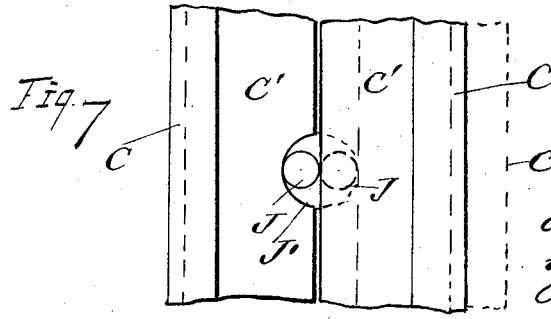

E. D. WOODS.
VEHICLE WHEEL.
APPLICATION FILED AUG. 14, 1916.
1,295,664.
Patented Feb. 25, 1919.
3 SHEETS—SHEET 3.
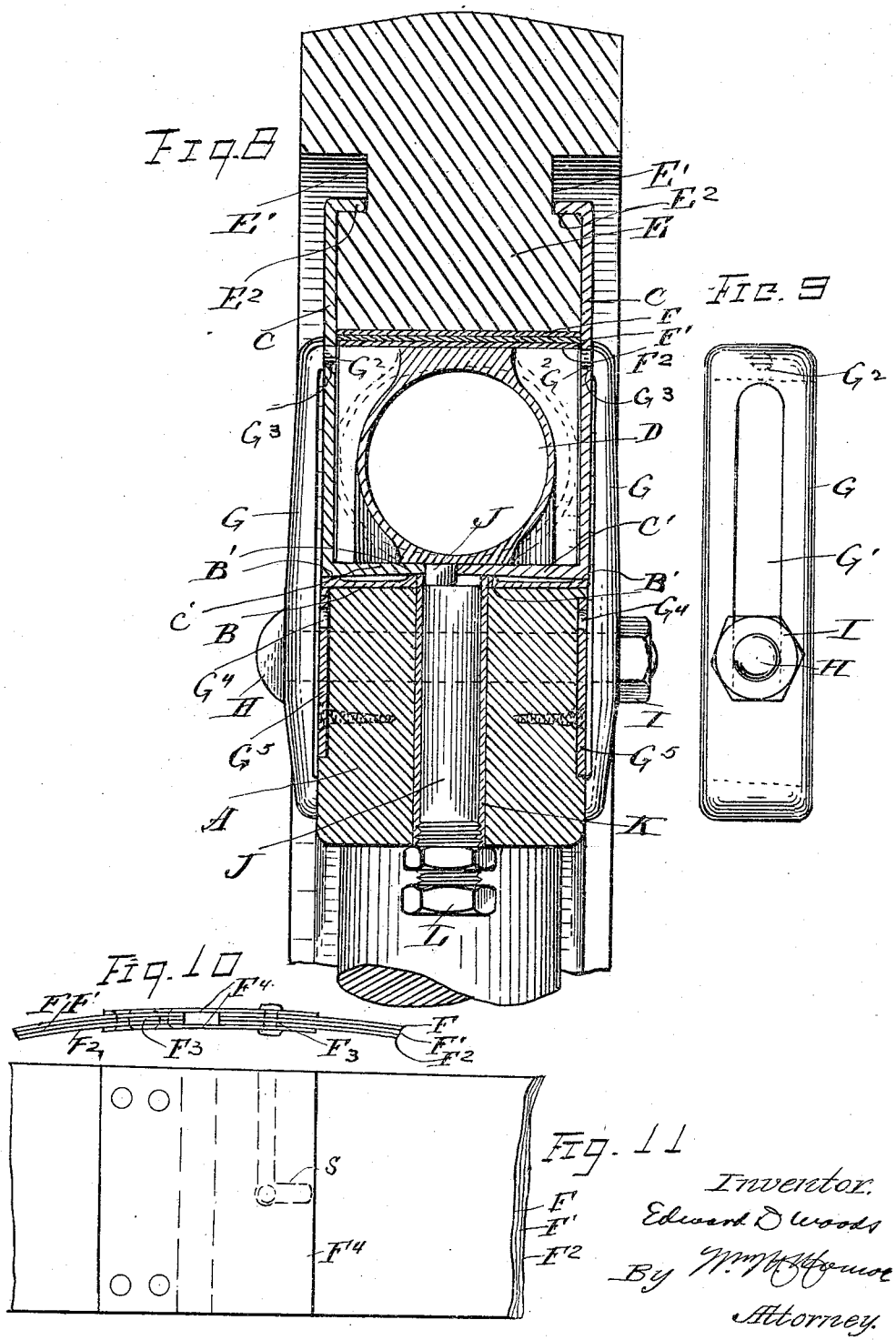

UNITED STATES PATENT OFFICE.

EDWARD D. WOODS, OF DETROIT, MICHIGAN, ASSIGNOR TO THE WOODS CUSHION WHEEL COMPANY, OF CLEVELAND, OHIO, A CORPORATION OF OHIO.

VEHICLE-WHEEL.

1,295,664.

Specification of Letters Patent.  Patented Feb. 25, 1919.

Application filed August 14, 1916. Serial No. 114,708.

*To all whom it may concern:*

Be it known that I, EDWARD D. WOODS, a citizen of the United States, and resident of Detroit, in the county of Wayne and State of Michigan, have invented certain new and useful Improvements in Vehicle-Wheels, of which I hereby declare the following to be a full, clear, and exact description, such as will enable others skilled in the art to which it appertains to make and use the same.

The objects of the invention are to provide an improved wheel rim having inner and outer tires combining the adjustable resiliency of a pneumatic tire with a compressible but not puncturable tread member, and also including intermediate compressible and transversely split annular spring members adapted to support the outer tread member and prevent loss of radial distance in the wheel, in case the pneumatic tire should become collapsed.

The invention includes a felly and metal felly band, and side plates embracing the tread member and inclosing between them the pneumatic tire and the annular compressible bands, and serving to maintain the parts of the wheel and tire in perfect alinement with each other.

It includes, a felly band having its outer face reversely tapered from a median line, and inwardly extending flanges or bearing faces upon the side plates, conversely tapered to contact with the inclined faces of the felly band, and prevent loose motion thereon and consequent rattling.

It includes means for maintaining the extremities of the annular spring members in alinement with each other as they are compressed, the opening between the ends permitting a limited amount of compression such as would be caused by normal pressure upon the springs, but also permitting them to abut under abnormal pressure and support and prevent injury to the tread member.

It further includes clamping members spaced about the felly and band, and adapted to force the tire retaining plates tightly upon the band and to retain them in position while in use.

It includes a power applying means for removing one of said tire holding plates from the band for permitting the pneumatic and tread members to be assembled in their places and to permit removing the same when they become worn.

It includes radially movable clamps adapted to be extended to secure the tire holding plates in place, and withdrawn to release the same and means for locking them in the extended and withdrawn positions.

The invention also comprises the combination and arrangement of parts and construction of details hereinafter described, shown in the accompanying drawings and specifically pointed out in the claim.

In the accompanying drawings Figure 1 is a front elevation of the wheel showing the parts assembled part of the annular side plate being removed; Fig. 2 is an edge view thereof; Fig. 3 is a transverse section of the rim; Fig. 4 is a plan of the cam employed to release one of the tire holding flanges; Fig. 5 is a side elevation thereof; Fig. 6 is a view of one of the clamping plates and its attaching bolt and nut; Fig. 7 is a plan view of the meeting edges of the side tire holding flanges showing the action of the cam which removes one of the flanges; Fig. 8 is a similar section to Fig. 3 showing the rim members reduced in size to the width of the felly and band. Fig. 9 is a face view of one of the clamps shown in Fig. 8; Fig. 10 is a side elevation of the ends of the laminated spring support for the tread member, and guides; Fig. 11 is a plan view thereof.

In these views A is the wooden felly of the wheel. B is the metal felly band thereon. The outer face of this band is preferably oppositely tapered at B', B' from the center toward its outer edges, so as to present inclined faces upon which are sleeved the annular side plates C which retain the pneumatic tire D and elastic tread member E in place.

Base members C' extend transversely and inwardly from the inner edges of the side plates, and have their circumferential inner faces conversely inclined to the inclined faces upon the periphery of the band so that the side plates can be tightly fitted thereto and will not become loose and rattle. They are also accurately centered thereby.

The pneumatic tire D is inclosed between these side plates and when inflated will fill the entire space between them, as shown in dotted lines in Fig. 8.

Superimposed upon the pneumatic tire between the side plates is shown an annular laminated spring member composed of the transversely split bands F, F', F², formed of spring steel against which the tire is expanded, and which are united together at one end at F³.

An opening is normally preserved between the extremities of the steel bands so that when external force is brought to bear upon them they can be compressed to a limited extent, and in case of injury to or deflation of the pneumatic tire will sustain the pressure upon the outer elastic tread member and prevent injury thereto, as well as providing a temporary substitute for the pneumatic tire until that can be inflated. When compressed the extremities of the spring bands abut together. Plates F⁴, F⁴ secured to the spring bands at one extremity overlap the other extremities and the alinement therewith is preserved by means of slots S, S in the spring bands and a pin or bolt S' passing through said slots and plates. The compressible tread member E rests upon the spring bands, and is provided with annular grooves E', E', in which inwardly extending annular flanges E², E² on the side plates C extend so as to retain the tread member E in place but permit the tread surface to extend laterally beyond the rim to present a broad surface to the road.

These grooves E', E' are wider than the projections E², E² so that some radial play is provided without tearing the elastic tread member, as the same is compressed by the weight upon the wheel.

In assembling the parts preferably the inner side plate (shown at the left of Fig. 3) is first put in place. The pneumatic tire D is then mounted thereon, the spring bands F, F', F² are then sleeved over the pneumatic tire, and next the tread member E is put in place. Finally the outer side plate is mounted upon the felly band, and clamps G, G, secured to the wooden felly by means of bolts H, H, and nuts I, I, are drawn outwardly, and radially to engage the sides of the side plates C, on opposite sides of the rim.

The nuts are then tightened upon them to rigidly secure them in place and to force the base members thereof upon the inclined faces of the felly band, until the parts are securely alined in their places.

In this manner the tire member and spring bands are made concentric with each other and with the felly band of the wheel.

The clamps are longitudinally slotted at G', G' to receive the bolts H, and to permit the clamps to move upon the bolts so as to extend and withdraw them. When in the extended position lugs G², G² upon the clamps enter openings G³, G³ in the side plates and lock the clamps in place.

Corresponding openings G⁴, G⁴ in plates G⁵, G⁵ attached to the felly of the wheel receive these lugs when the clamps are withdrawn, and lock them so that they will not fall and interfere with assembling the parts of the rim.

When it is desired to remove the rim a rotatable cam J inserted through the felly and through a sleeve K is provided with a head L by means of which it can be turned to engage the inner edge of one of the base flanges of the side plates to dislodge the same.

The cam is preferably placed in the median line of the felly band, and an opening J' is cut in the adjacent edge of the other base to prevent the cam from dislodging that side plate also. A valve tube T is shown in Fig. 1 with which the pneumatic tire is inflated and which passes through the felly of the wheel.

When the weight of the vehicle comes upon the wheel the resilient tread will be compressed until the outer faces of the grooves engage forcibly the outer faces or peripheries of the circumferential flanges upon the side plates, simultaneously the circular bands engaging the inner face of the tread member are forced against the diametrically opposite portion of the said tread member and force the inner sides of the grooves against the inner sides of the annular circumferential flanges. In this manner frictional bearing contact is established substantially over the entire peripheries of the side plates between the same and the resilient surfaces of the tread member, and the amount of surface in actual contact is increased.

Having described the invention what I claim as new and desire to secure by Letters Patent is:

A wheel rim of the character described, comprising a felly, a felly band thereon, a depressible tire or tread member, annular side plates adapted to maintain the tire in operatable relation to the felly, a laminated annular spring member supporting said tread member, said annular spring member having its ends spaced apart to permit of a predetermined amount of compression thereof, means for maintaining the ends of said springs in alinement with each other, so as to remain separate under normal compression, and to abut under abnormal compression, and a pneumatic tire inclosed between said annular spring member, side plates, and felly band.

In testimony whereof I hereunto set my hand this 4th day of July, 1916.

EDWARD D. WOODS.

In presence of—
W<small>M</small>. M. M<small>ONROE</small>,
C<small>HAS</small>. C. G<small>OLDMAN</small>.